United States Patent
Sloan

(10) Patent No.: US 7,623,266 B2
(45) Date of Patent: Nov. 24, 2009

(54) GAMUT MAPPING WITH SATURATION INTENT

(75) Inventor: Rocklin J. Sloan, San Jose, CA (US)

(73) Assignees: Canon Kabushiki Kaisha, Tokyo (JP); Microsoft Corporation, Redmond, WA (US)

( * ) Notice: Subject to any disclaimer, the term of this patent is extended or adjusted under 35 U.S.C. 154(b) by 608 days.

(21) Appl. No.: 11/399,972

(22) Filed: Apr. 7, 2006

(65) Prior Publication Data

US 2007/0236761 A1  Oct. 11, 2007

(51) Int. Cl.
  H04N 1/60   (2006.01)
  G06K 15/00  (2006.01)
  G03F 3/08   (2006.01)
  G06K 9/00   (2006.01)
  G09G 5/02   (2006.01)
(52) U.S. Cl. ............... 358/1.9; 358/2.1; 358/518; 382/162; 345/589
(58) Field of Classification Search .............. None
  See application file for complete search history.

(56) References Cited

U.S. PATENT DOCUMENTS

| | | | | |
|---|---|---|---|---|
| 5,537,228 | A * | 7/1996 | Dillinger | 358/502 |
| 6,297,826 | B1 * | 10/2001 | Semba et al. | 345/589 |
| 6,441,869 | B1 * | 8/2002 | Edmunds | 348/651 |
| 6,618,499 | B1 * | 9/2003 | Kohler et al. | 382/162 |
| 6,719,392 | B2 * | 4/2004 | Qiao | 347/15 |
| 6,995,865 | B1 * | 2/2006 | Motomura | 358/1.9 |
| 2003/0072016 | A1 * | 4/2003 | Dalrymple et al. | 358/1.9 |
| 2005/0073730 | A1 * | 4/2005 | Huang et al. | 358/518 |

(Continued)

FOREIGN PATENT DOCUMENTS

JP  3-158075  7/1991

(Continued)

OTHER PUBLICATIONS

J. Morovic, et al., "The Fundamentals of Gamut Mapping: A Survey", Journal of Imaging Science and Technology, Society for Imaging Science and Technology, vol. 45, No. 3, pp. 283-290, Springfield, May-Jun. 2001.

(Continued)

Primary Examiner—Twyler L Haskins
Assistant Examiner—Barbara D Reinier
(74) Attorney, Agent, or Firm—Fitzpatrick, Cella, Harper & Scinto

(57) ABSTRACT

Techniques for use in gamut mapping processes are presented, including a method for mapping cusp points using hue wheels to obtain a source relative hue angle, and interpolating a lightness value at the source point hue. A maximum chroma value is determined at the source hue and the interpolated lightness, thus defining a source primary cusp point. A primary cusp point for a second color gamut is similarly obtained, and the source primary cusp point is mapped to the destination primary cusp point using a shear mapping technique. Another technique includes performing lightness compression by applying a chroma dependency factor and either a first or second factor, depending on a comparison of a lightness values of a destination point and a second point. Another technique involves performing chroma expansion by comparing chroma extents of source and destination points, and adjusting the chroma of the destination point based on the comparison.

6 Claims, 13 Drawing Sheets

U.S. PATENT DOCUMENTS

2005/0195415 A1* 9/2005 De Baer ...................... 358/1.9
2005/0248784 A1* 11/2005 Henley et al. ................ 358/1.9
2006/0007460 A1* 1/2006 Bogdanowicz et al. ....... 358/1.9

FOREIGN PATENT DOCUMENTS

| JP | 2845523 B2 | 1/1999 |
|---|---|---|
| JP | 2000-134487 | 5/2000 |
| JP | 3987215 | 10/2007 |

OTHER PUBLICATIONS

CIE Technical Report, "A Colour Appearance Model for Colour Management Systems: CIECAMO2", International Commission On Illumination, ISBN: 3-901-906 (2003).

* cited by examiner

GAMUT MAPPING WITH SATURATION INTENT

BACKGROUND OF THE INVENTION

1. Field of the Invention

This invention pertains to gamut mapping methods. Specifically, the invention relates to gamut mapping methods using primary cusp points, lightness compression toward cusp point lightness, and chroma expansion, and further relates to the use of these techniques to enable simulation of saturation control in an appearance space that is generally lacking direct saturation control, through the manipulation of lightness and chroma.

2. Related Background Art

Gamut mapping is the procedure by which the colors from one device are rendered into the color space of another device. A common form of gamut mapping is performed when a source image, coming from a device having a large color gamut, is mapped to a reproduction device having a smaller color gamut.

The development of gamut-mapping algorithms (GMAs) has gathered much momentum in the last decade and certainly, much progress has been made. However, unless two devices are identical, there is always the possibility that a better mapping between the two can be found. In any case where the colors of a large gamut need to be rendered into the colors of a smaller gamut, decisions need to be made as to just exactly how this should be done. The decisions are not only based upon the two gamuts, but also on the images being mapped and the intent of the reproduction.

While many GMAs attempt to reproduce colors as accurately as possible, this type of conversion can result in dull colors being rendered into the destination gamut, which can produce unappealing results. This problem can be particularly noticeable when printing business graphics, for which a user may want to produce bright, vivid colors.

SUMMARY OF THE INVENTION

To address the foregoing, the present invention accomplishes gamut mapping using primary cusp points, lightness compression toward the cusp point lightness, and chroma expansion. In many situations, use of these techniques produces better relative saturation and smoother results across color transitions (gradients). In addition, these techniques can allow a simulation of smooth saturation control in an appearance space that is lacking a direct saturation element, such as JCh.

In one aspect, the present invention maps cusp points for use in a gamut mapping process. According to this aspect of the invention, a source point having a source hue value in a first color gamut is input. A source hue wheel and a destination hue wheel each comprising known hue angles for each of primary and secondary color components of the first color gamut and a second color gamut, respectively, are obtained. From the hue wheels, a source relative hue position of the source point is determined between the nearest primary hue and the nearest secondary hue in the source hue wheel. A first lightness value for the nearest primary hue and a second lightness value for the nearest secondary hue are determined. Then, if the source hue value is not a primary or secondary hue value, interpolation is performed, utilizing the source relative position as a factor, between the first lightness value and the second lightness value to obtain a first interpolated lightness value at the hue value of the source point. A first maximum chroma value is then determined from the gamut boundary at the first interpolated source lightness value and the source hue value. As a result, the first interpolated lightness value, the source hue value, and the first maximum chroma value define a source primary cusp point. The foregoing process is performed in a similar manner with respect to the destination hue wheel. In this regard, a corresponding relative hue position is determined in the destination hue wheel between a destination primary hue and a destination secondary hue corresponding, respectively, to the nearest primary hue and the nearest secondary hue in the source hue wheel, the corresponding relative hue position having a destination hue value in the destination hue wheel. Then, a first destination lightness value is determined for the nearest destination primary hue and a second destination lightness value is determined for the nearest destination secondary hue. Interpolation is performed, utilizing the source relative position as a factor, between the first destination lightness value and the second destination lightness value to obtain a first interpolated destination lightness value at the destination hue value. A first maximum destination chroma value is determined from the second gamut boundary at the first interpolated destination lightness value and the destination hue value. As a result, the first interpolated destination lightness value, the destination hue value, and the first maximum destination chroma value define a destination primary cusp point. Finally, the source primary cusp point can be mapped to the destination primary cusp point using, for example, a shear mapping technique.

In another aspect of the present invention, lightness compression of the mapped cusp points is performed, where the cusp points may be primary cusp points mapped according to the foregoing aspect of the invention. In this aspect, a chroma dependency factor is determined based on a chroma value of a destination point and a chroma value of the destination primary cusp point. If a lightness value of the destination point is greater than a lightness value of the destination primary cusp point, a first factor is determined based on a maximum lightness value of the second color gamut, and a new destination point lightness value is determined based on the chroma dependency factor and the first factor. However, if the lightness value of the destination point is not greater then the lightness value of the destination primary cusp point, a second factor is determined based on a minimum lightness value of the second color gamut, and the new destination point lightness value is determined based on the chroma dependency factor and the second factor.

In a further aspect of the present invention, a chroma expansion process is performed, where the process may be applied to cusp points mapped and/or lightness compressed according to the foregoing aspects. In this aspect of the invention, a chroma extent is determined at a lightness value and the hue value of the source point in the first color gamut, and a chroma extent is determined at a lightness value and the hue value of a destination point in the second color gamut. The chroma extent of the source point is compared to the chroma extent of the destination point, and if the chroma extent of the destination point is greater than the chroma extent of the source point, the destination point chroma value is adjusted accordingly.

In another aspect, the present invention performs lightness compression for use in a gamut mapping process. A chroma dependency factor is determined based on a chroma value of a destination point and a chroma value of a second point, which is in a color gamut. If a lightness value of the destination point is greater than a lightness value of the second point, a first factor is determined based on a maximum lightness value of the color gamut, and a new destination point lightness value is determined based on the chroma dependency factor and the first factor. If the lightness value of the destination point is not greater than the lightness value of the second point, a second factor is determined based on a minimum lightness value of the color gamut, and the new destination point lightness value is determined based on the chroma dependency factor and the second factor.

The chroma dependency factor can be based on a multiplication factor. For example, in one aspect of the present invention, the chroma dependency factor is equal to the product of the multiplication factor and the chroma value of the destination point divided by the chroma value of the second point.

The first and second factors can be based on a power function, for example, a second order function.

In another aspect, the present invention performs chroma expansion for use in a gamut mapping process. A chroma extent at a lightness and hue of a source point is determined, and a chroma extent at a lightness and hue of a destination point is determined, the destination point having a chroma value. The chroma extent of the source point is compared to the chroma extent of the destination point. If the chroma extent of the destination point is greater than the chroma extent of the source point, the destination point chroma value is adjusted.

Gamut mapping can be performed using the chroma value of the destination point, if the chroma extent of the destination point is not greater than the chroma extent of the source point.

In another aspect of the present invention, adjusting the destination point chroma value includes multiplying the destination point chroma value by the chroma extent of the destination point divided by the chroma extent of the source point.

In a further aspect, the present invention simulates saturation control in a gamut mapping process in a color space without a saturation channel. In this aspect, lightness compression of a first point lightness toward a second point lightness is performed to obtain a second point, and chroma expansion is performed on the second point.

The invention may be embodied in a method, apparatus or computer-executable program code, and in particular, a color management module.

This brief summary has been provided so that the nature of the invention may be understood quickly. A more complete understanding of the invention can be obtained by reference to the following detailed description in connection with the attached drawings.

DETAILED DESCRIPTION OF THE PREFERRED EMBODIMENTS

Embodiments of the present invention are described below with reference to the accompanying drawings. The embodiments describe gamut mapping methods using primary cusp points, lightness compression toward cusp point lightness, and chroma expansion, and further describe the use of these techniques to enable simulation of saturation control in an appearance space that is generally lacking direct saturation control, through the manipulation of lightness and chroma.

Particularly in situations demanding vivid, bright colors, such as business graphics, a GMA that attempts to maintain saturation of the primary and secondary colors as the colors are mapped from the input device to the output device can be useful. This type of GMA can be termed a GMA with "saturation intent," since the intent of the GMA is to maintain high saturation (e.g. for business graphics images), but not necessarily to maintain precise color matching. The embodiments described below operate on colors in appearance space, and in particular, JCh space. However, one skilled in the art will recognize that the features of the invention can be applied in other color spaces as well.

The embodiments described below allow better correlation of the primary/secondary colors between devices, allow control and enhancement of the saturation range of the image on the output device, and allow a "simulated" saturation control in an appearance space that is lacking a direct saturation element. Improved reproduction of smooth color transitions (gradients) and improved computational efficiency are additional benefits.

Figure 1:
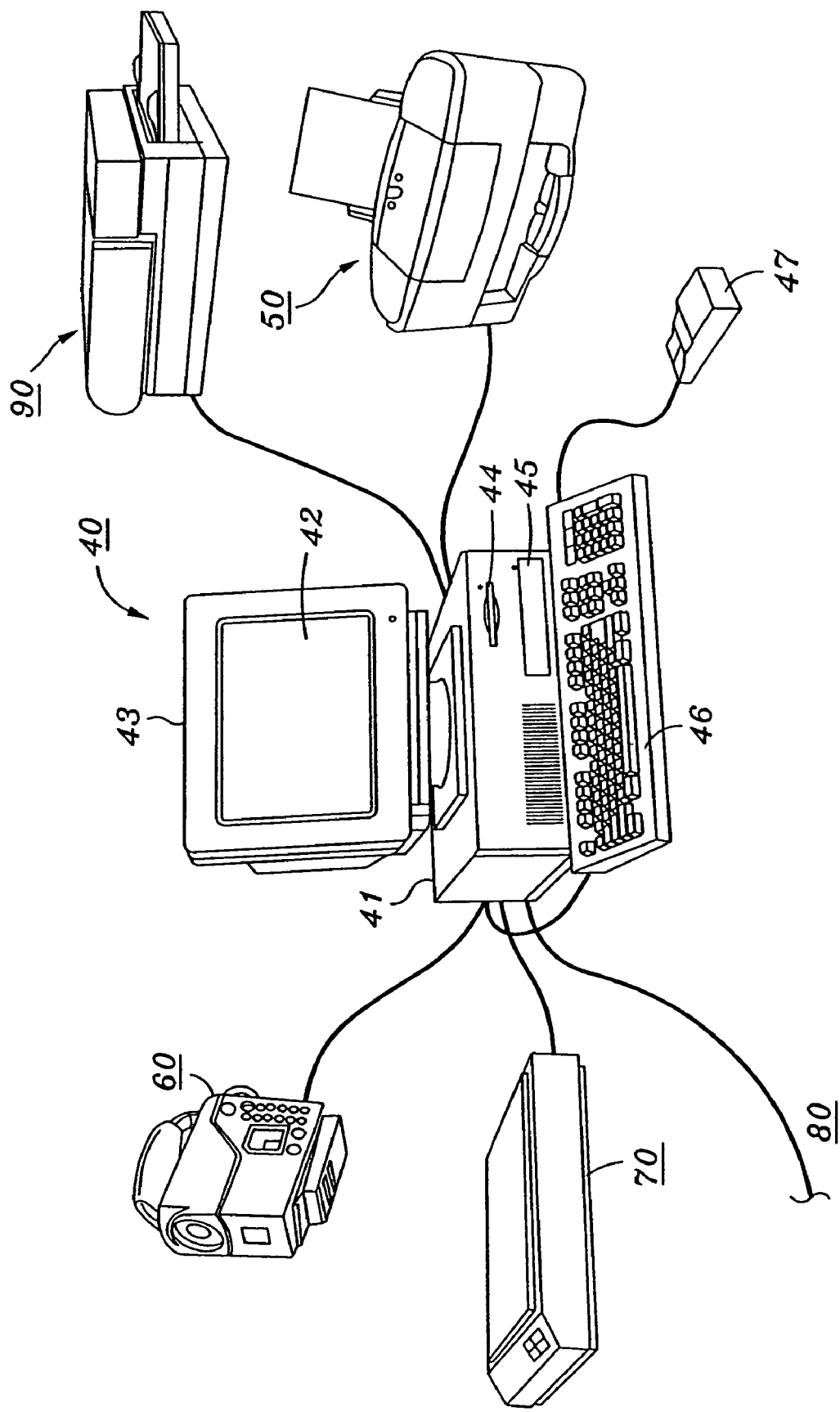
FIG. 1 depicts a representative computer system environment for implementation of the present invention.

FIG. 1 depicts an example of a computing environment in which the present invention can be implemented. Computing equipment 40 includes host processor 41, which comprises a personal computer (hereinafter "PC"), such as an IBM PC-compatible computer having a windows-type environment such as Microsoft Windows 98, Windows 2000, Windows Me, Windows XP, or Windows NT, or other operating system such as LINUX. Computing equipment 40 includes color monitor 43 having a display screen 42, keyboard 46 for entering data and user commands, and pointing device 47, which comprises a mouse for manipulating objects displayed on display screen 42.

Computing equipment 40 also includes computer-readable memory devices such as fixed disk 45 and/or floppy disk drive 44. Floppy disk drive 44 provides a means whereby computing equipment 40 can access information, such as digital image data, computer-executable process steps, application programs, etc. stored on removable memory media. Information can also be retrieved through other means such as a USB storage device connected to a USB port (not shown) of computer 40, or through network interface 80. Additionally, a CD-ROM drive and/or a DVD drive (not shown) can be included so that computing equipment 40 can access information stored on removable CD-ROM and DVD media.

Printer 50 as depicted in FIG. 1 is a color bubble jet printer, which forms color images on a recording medium such as paper or transparencies or the like. Printer 90 as depicted in FIG. 1 is a different type of printer than printer 50, such as a color laser printer, which also forms color images on a recording medium such as paper or transparencies or the like. Printer 50 and printer 90 form color images using cyan, magenta, yellow and black inks, although the present invention can be used with printers and devices which use other colorant combinations. The invention is not limited to being used in conjunction with color printers, but can also be used with other devices that use various colorant combinations. In addition, digital color scanner 70 is provided for scanning documents and images and sending the corresponding digital image data to computing equipment 40. Digital color camera 60 is also provided for sending digital image data to computing equipment 40. Of course, computing equipment 40 may acquire digital image data from other sources such as a digital video camera, a local area network or the Internet via network interface 80.

Figure 2:
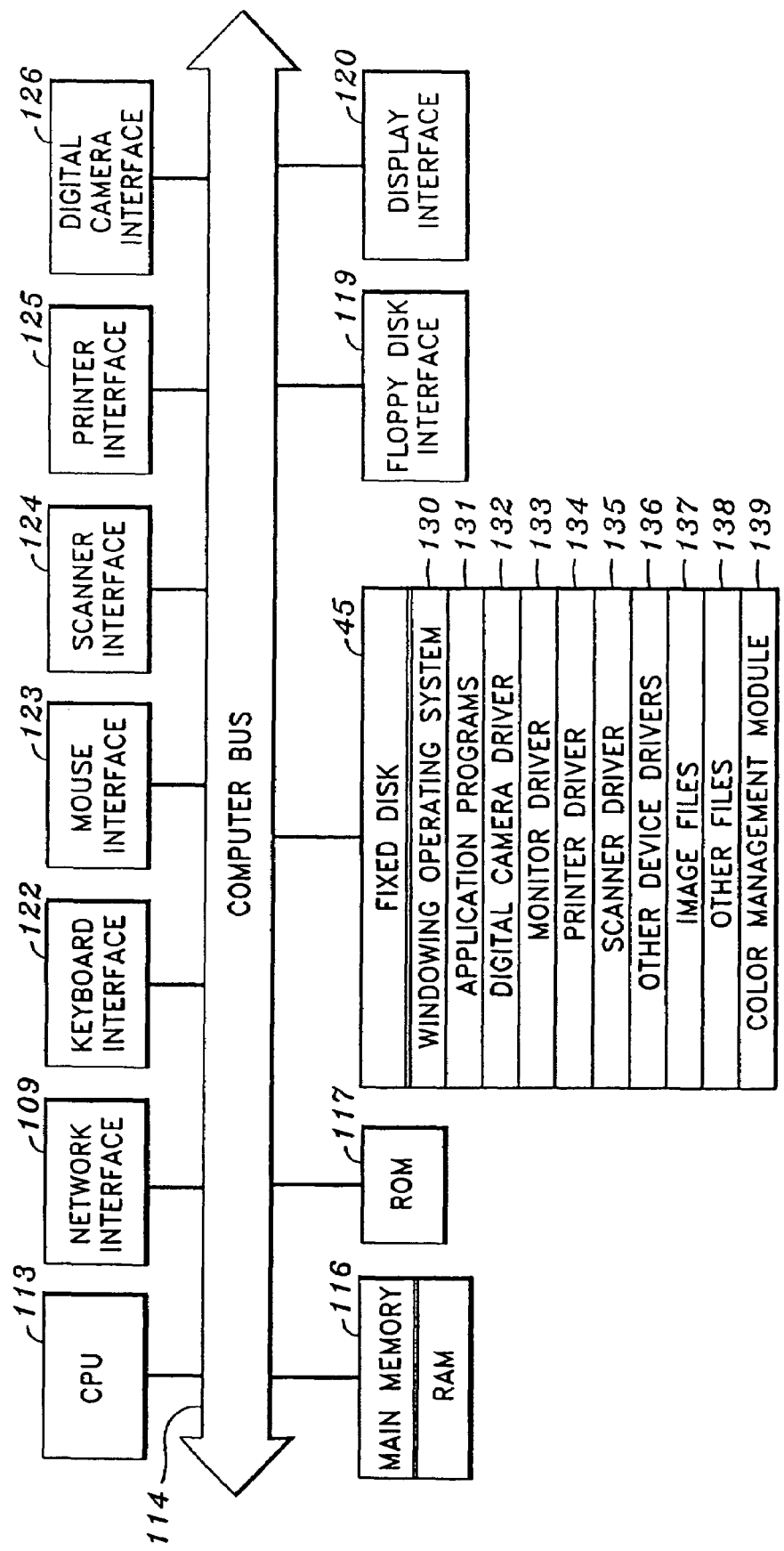
FIG. 2 is a detailed block diagram showing the internal architecture of the computer system of FIG. 1.

FIG. 2 is a detailed block diagram showing an example of the internal architecture of host processor 41 of computing equipment 40. As shown in FIG. 2, host processor 41 includes central processing unit (CPU) 113 which interfaces with computer bus 114. Also interfacing with computer bus 114 are fixed disk 45, network interface 109, random access memory (RAM) 116 for use as a main run-time transient memory, read only memory (ROM) 117, floppy disk interface 119, display interface 120 for monitor 43, keyboard interface 122 for keyboard 46, mouse interface 123 for pointing device 47, scanner interface 124 for scanner 70, printer interface 125 for printers 50 and 90, and digital camera interface 126 for digital camera 60.

RAM 116 interfaces with computer bus 114 so as to provide information stored in RAM 116 to CPU 113 during execution of software programs such as an operating system, application programs, such as color management module 139, and device drivers. More specifically, CPU 113 first loads computer-executable process steps from fixed disk 45, or another storage device into a region of RAM 116. CPU 113 can then execute the stored process steps from RAM 116 in order to execute the loaded computer-executable process steps. Data such as digital color images or other information can be stored in RAM 116, so that the data can be accessed by CPU 113 during the execution of computer-executable process steps that need to access and/or modify the data.

As also shown in FIG. 2, fixed disk 45 contains operating system 130, which is a windows-type operating system, although other operating systems may be used, and application programs 131, such as a word processing program or a graphic image management program. Fixed disk 45 also contains digital camera driver 132, monitor driver 133, printer driver 134, scanner driver 135, and other device drivers 136. Fixed disk 45 also includes image files 137, other files 138, and color management module 139 which is used to render source image color data (for example, an image displayed on display screen 42) for reproduction on a destination output device, such as printer 50. Before describing the color management module 139 in more detail, a general background of gamut mapping will be discussed.

Each device used to output images (e.g., monitors, printers, scanners, etc.) has a range of colors that it can reproduce. This range is known as the device's color gamut. Color gamuts differ between different devices, and in particular between different types of devices, as well as between different color spaces. For example, color printers typically have color gamuts that are different from those of color monitors. In addition, different types of color printers, such as ink jet printers and color laser printers, typically have different color gamuts with respect to one another. Further, a device that uses the Adobe RGB color space has a different color gamut than a device that uses the sRGB color space.

Producible colors for images output by a system such as computer system 40 may fall within (i.e., inside the volume of) a color gamut for one image output device, such as monitor 42, but outside of a color gamut for another image output device, such as printer 50. Images displayed by computer 41 that are to be output to printer 50 often include colors outside of the color gamut for printer 50. In order for printer 50 to output an image that looks substantially the same as the image displayed by computer 41, the out-of-gamut colors must be mapped to colors that fall within the color gamut of printer 50.

Figure 3:
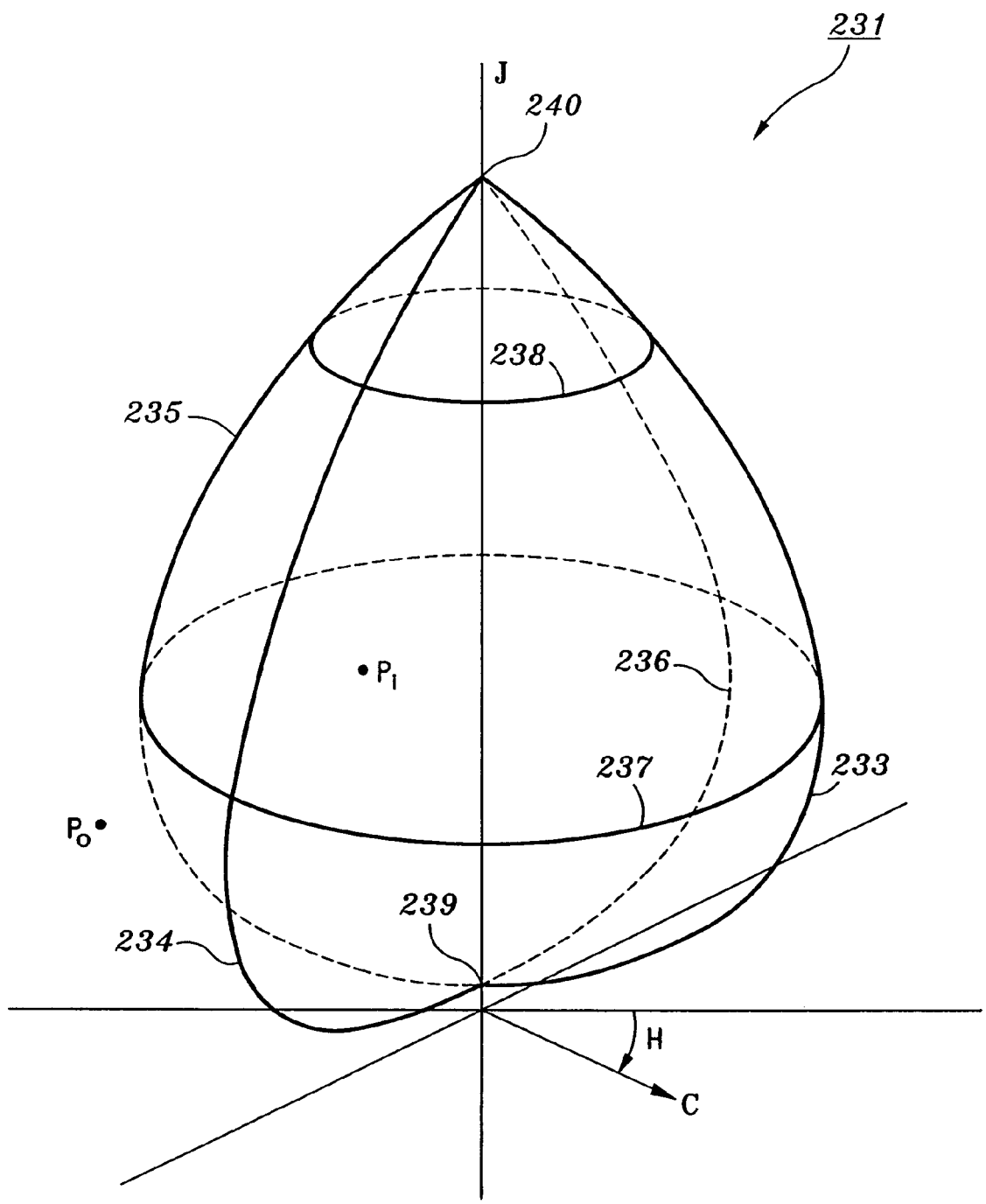
FIG. 3 is a representative color gamut surface.

FIG. 3 is a representative view of a color gamut surface that could represent a color gamut of, for example, monitor 43 or printer 50. Colors represented by points enclosed by the color gamut surface fall within the color gamut of the device and therefore can be input or output by the device corresponding to the color gamut. Shown in FIG. 3 is color gamut surface 231 in three-dimensional JCh color space, for example the CIECAM02 color space, although it could correspond to any color space. This three-dimensional color space is defined by the following cylindrical coordinates: J, a scalar lightness value; h, a hue value in degrees; and c, a scalar chroma value. While the invention can be employed in conjunction with the CIECAM02 color space, it should be noted that the invention can be implemented in other color spaces. Also, the color gamut surface need not be mapped in a cylindrical color space.

In FIG. 3, color gamut surface 231 is illustrated by lines running along the color gamut surface. Line 233 runs along color gamut surface 231 at a hue value of 0 degrees; line 234 runs along color gamut surface 231 at a hue value of 90 degrees; line 235 runs along color gamut surface 231 at a hue value of 180 degrees; and line 236 runs along color gamut surface 231 at a hue value of 270 degrees. Lines 237 and 238 run along color gamut surface 231 at constant lightness values. On the lightness (J) axis, points on the color gamut surface for a zero chroma value overlap at points 239 and 240, which represent the black and white points, respectively, of the color gamut.

Color gamut surfaces typically are not symmetric. In fact, a color gamut surface typically includes at least some irregularly-shaped portions. Color gamut surface 231 in FIG. 3 therefore is shown as a non-symmetric surface. For example, the color gamut surface at line 233 for hue value 0 degrees is shaped differently than the color gamut surface at line 235 for hue value 180 degrees. Point Pi in FIG. 3 falls within color gamut surface 231 and therefore, a color represented by point Pi can be output by the device corresponding to color gamut surface 231. In contrast, point Po falls outside of the color gamut surface 231, indicating that a color represented by point Po cannot be output by that device.

In order to render the colors of one device onto another device having a different color gamut, color management module 139 utilizes a GMA. For instance, if emphasis on color saturation is desired, one GMA (hereinafter "example GMA") involves creating hue wheels for the source and destination devices before transforming source colors. These hue wheels contain the hue angles for the primary colors (red, green, blue) and the secondary colors (cyan, magenta, yellow) that will be used as reference points for a hue rotation process. A lightness rescaling mapping that will map source color lightness values (J) to the lightness range of the destination gamut is also created. Hue rotation is performed on each source color to determine a destination hue angle. A source color is mapped via hue rotation by first finding the two bounding source reference points and interpolating the similar position between the corresponding destination reference points, yielding a destination hue angle or value. A lightness (J) scaling is performed to map the source lightness to the destination range.

"Cusp" points are determined at the source and destination hue angles. The "cusp" point used in the example GMA is the point on the gamut surface with the greatest chroma (C) value at that hue angle. A "shear mapping" process that maps the source cusp point to the destination cusp point is performed, and this mapping is used to transform the source color point to the destination point. If, after the shear mapping, the destination point lies outside the destination gamut surface, the point is moved to the nearest point on the destination gamut surface (minimum color distance clipping).

While the foregoing example GMA can generally produce good results, implementation of the example GMA can also yield a number of noticeable problems in a variety of real-world situations. For example, a good saturation match might not be obtained for the primaries of certain output devices (notably RGB printers). This could result in de-saturated primaries on the destination device in some cases. Also, various colors might not be saturated enough for certain devices after the shear mapping. Finally, some primary-to-primary (or secondary) color transitions (gradients) might contain artifacts such as tone reversals (bright or dark areas in the transition) or de-saturated areas.

These problems are mainly due to the difficulty in performing a saturation intent mapping (to preserve the relative saturation) in an appearance space such as JCh, in which direct saturation control is lacking, as opposed to other spaces such as Jsh, HSV, Qsh, etc., in which a direct saturation element is implemented and available for manipulation. Other problems can arise due to the shape of certain gamuts and the location of the primaries relative to the maximum chroma point.

However, these problems can be reduced or eliminated using techniques of the present invention, embodiments of which are described in detail below. First, a general discussion of each technique is presented. After each technique is discussed, a representative GMA utilizing the techniques is described. Utilization of the techniques of lightness compression toward cusp point lightness and chroma expansion in a GMA enables simulation of saturation control in an appearance space that is lacking direct saturation control, through the manipulation of lightness and chroma. Note that in the discussion below, the six primary/secondary hues (Red, Green, Blue, Cyan, Magenta, Yellow) are occasionally referred to simply as the "primary hues."

First, it is noted that the foregoing example GMA uses the maximum chroma cusp point as the mapping point in the shear process (the source maximum chroma cusp point is mapped to coincide with the destination maximum chroma cusp point). Using the maximum chroma cusp point in the shear mapping process provides a simple and consistent method to determine mapping points for any given hue angle, and since most devices' maximum chroma cusp points tend to conform to the primary color points, the shear mapping generally results in a good fit. However, on some devices the primary color points do not coincide with the maximum chroma cusp point at the primary hue. When using the example GMA in this situation, the source primary does not map to the destination primary, but would tend to map to a brighter, de-saturated color that is close to the destination primary but slightly washed out in appearance.

One technique that can be applied to address this problem uses a new "cusp" point, called a "primary cusp" point. Specifically, at the primary hues the full primary points are known (from the device profile, for example). Using the primary points as the cusp points for the mapping allows for fully saturated primary colors when mapped from source to destination. However, the primary cusp point for a hue between primaries is not available in the profile, so it needs to be interpolated between the adjacent primary colors in a similar fashion as the hue rotation, but in the lightness (J) realm.

Figure 4A:
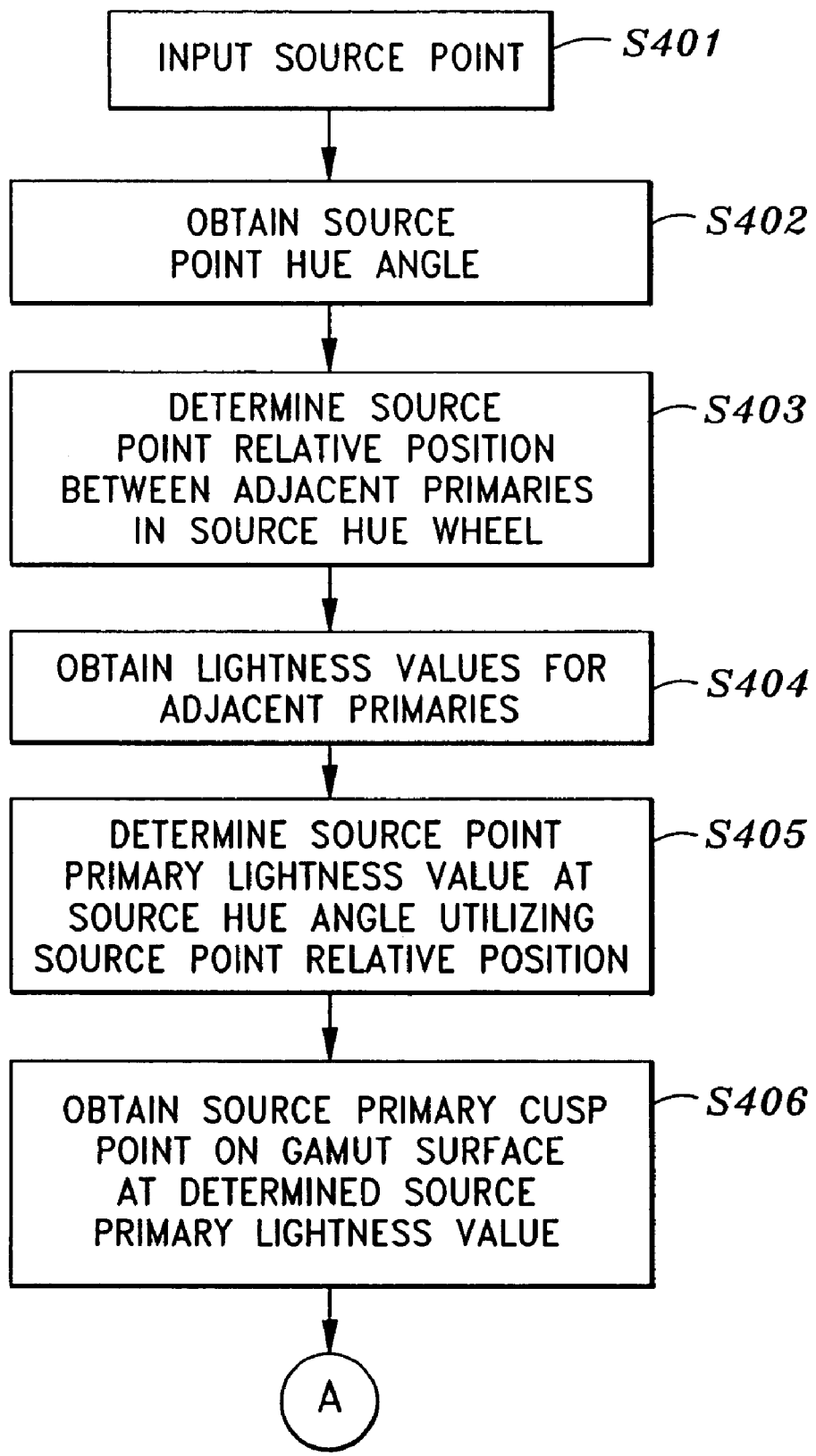
FIGS. 4A and 4B depict a process flowchart according to one embodiment of a primary cusp point technique.
Figure 4B:
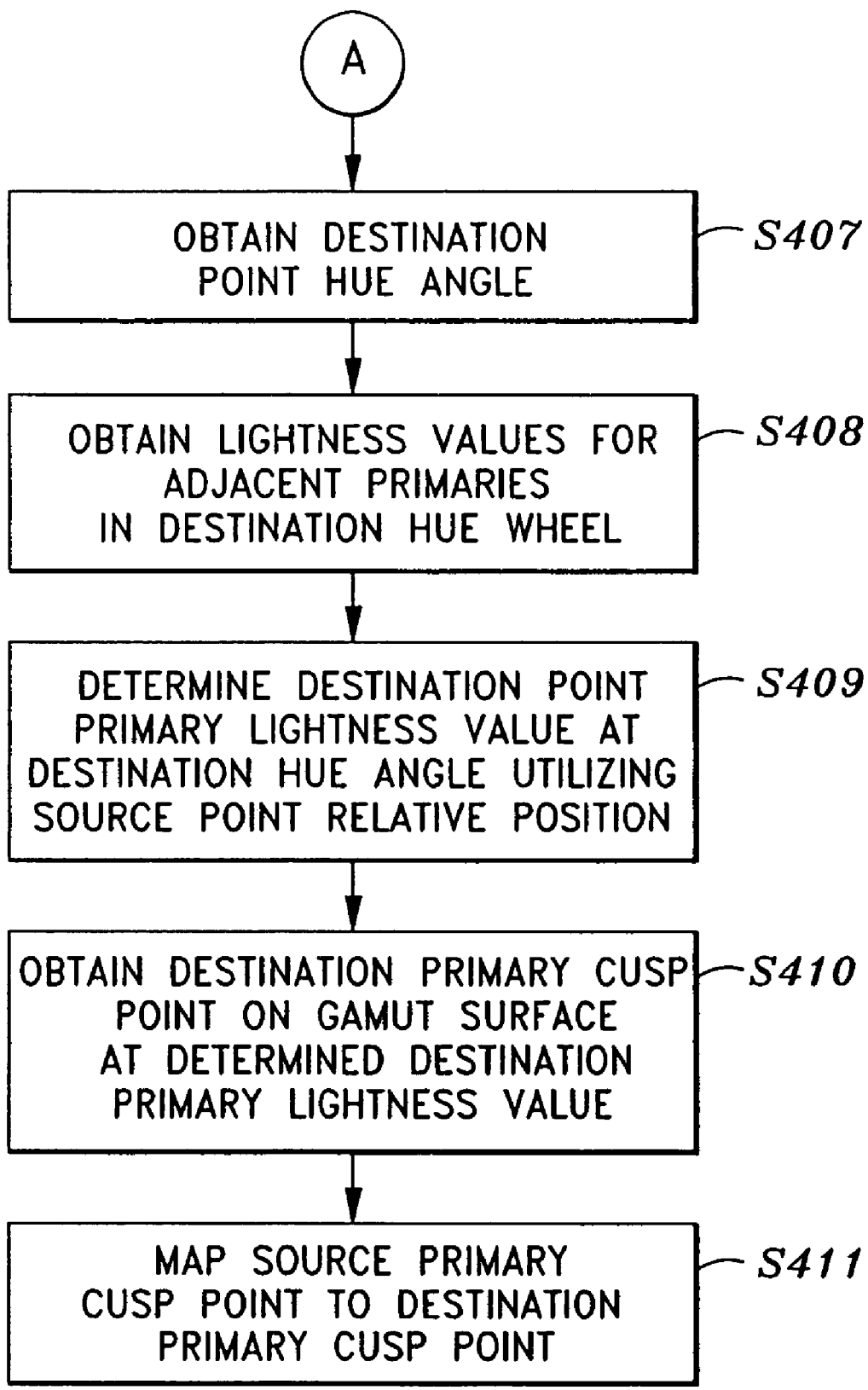

FIGS. 4A and 4B depict flowcharts illustrating one embodiment of the primary cusp point mapping technique according to the invention. First, the source point to be mapped is input (step S401), and the hue angle (h) of the source point is obtained (step S402). In step S403, the relative position of the source point between adjacent primaries is determined. This process will now be described in more detail with regard to FIG. 9A.

The invention utilizes a hue rotation process when performing the mapping. Briefly, hue rotation refers to a process whereby the hue angle of any given color in the source is determined relative to the nearest primary and secondary colors so that a relative hue angle in the destination gamut can be determined. That is, the hue angle of any color in a hue wheel of the source gamut is determined as a percentage of its distance between two known colors, one of which is a primary color (e.g., Red, Blue or Green) and the other a secondary color (e.g., Magenta, Cyan, or Yellow). After determining the relative location (i.e., the hue wheel reference point) of the color in the source hue wheel, the same relative position between the same two corresponding known primary colors in the destination hue wheel is determined, yielding the destination hue angle.

Figures 9A, 9B:
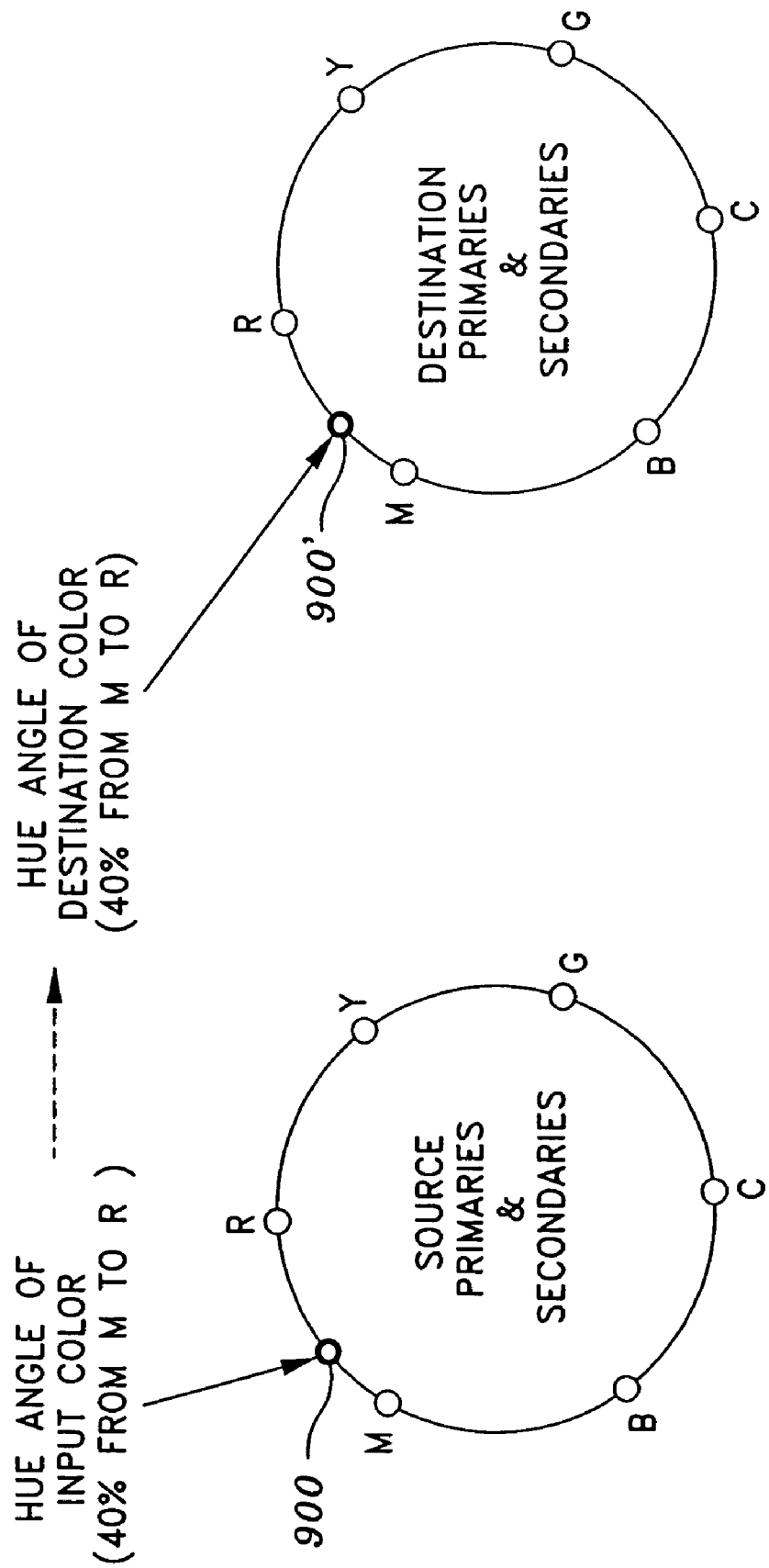
FIGS. 9A and 9B depict source and destination hue wheels, respectively, for performing a hue rotation process.

Referring specifically to FIG. 9A, knowing the input (source) point to be mapped, the hue angle is also known. Applying the source point to the source hue wheel, a source relative position of the source point between the source primaries adjacent to the source point are also known. Thus, the relative distance (position) of the source point to the two adjacent primaries can be determined. As seen in FIG. 9A, the source point relative position may be 40% of the distance from the Magenta primary to the Red primary. This relative position of the source point between the primaries is then used in further calculations for the mapping process.

In more detail, hue rotation is performed by using the reference points to calculate a hue angle based on the input color, and obtaining the destination hue based on the hue angle. Specifically, the relative position of the input color between the nearest primary and secondary color is determined. For example, from the source hue wheel, it is known that the hue angle of the red primary (R)=355 degrees and that the hue angle of the magenta secondary (M)=295 degrees. It is also known that the input color 900 has a hue of 319 degrees, which falls between R (red primary) and M (magenta secondary). The location of the input color relative to these two colors is determined and in the example of FIG. 9A, the input color is determined to lie at a point 40% of the distance between the magenta (M) and red (R) colors. Since the location of the hue in the source was determined to lie at 40% of the distance between the M and R colors, a corresponding location between the M and R colors in the destination hue wheel is determined. Thus, referring to FIG. 9B, it is known that the R color in the destination hue wheel lies at 346 degrees and that the M color lies at 290 degrees. Calculating a location for the point (900') on the destination hue wheel that lies at 40% of the distance (22 degrees) between the destination R and M colors results in the destination hue angle of 312 degrees. Thus, the destination hue angle is obtained for the destination gamut at 312 degrees.

Returning to FIG. 4A, once the source relative position between the adjacent primaries is determined (step S403), lightness (J) values for each of the adjacent primaries are obtained (step S404). The lightness values of the primaries for each of the source and destination gamuts are known values. Having obtained the lightness (J) values for the adjacent primaries (S404), the source relative position obtained in step S403 is used to determine a source primary lightness value (step S405). That is, a lightness value at the source hue angle is determined by interpolation between the adjacent primary lightness values, utilizing the source relative position as an interpolation factor. Then, at the source point primary lightness value determined in step S405, the point of intersection at the gamut surface boundary at the determined source primary lightness value is found, thereby resulting in a source primary cusp point (step S406) that will be used in the mapping as described below.

Referring now to FIG. 4B, the mapping process turns to the destination device. In step S407, the first process to be performed is a hue rotation process to determine the destination hue angle. As seen in FIG. 9B, a destination hue wheel is obtained from the destination gamut, where the primary and secondary hues are known in the destination gamut. Utilizing the source relative position determined in step S403, the same relative position between the corresponding primaries in the destination hue wheel is determined. This relative position is used to backout a destination hue angle.

Having obtained the destination hue angle, the lightness (J) values for the adjacent primaries in the destination gamut are obtained (step S408). Utilizing a process similar to step S405, the destination primary lightness value is determined via interpolation, utilizing the source relative position as a factor (step S 409). At the determined destination primary lightness value, a point of intersection on the destination gamut boundary surface is found, thereby resulting in a destination primary cusp point (step S410). Lastly, once the source primary cusp point and the destination primary cusp point have been obtained, the source primary cusp point is mapped to the destination primary cusp point (step S411). Of course, the source point is proportionally mapped in accordance with the source, and virtually any mapping technique can be utilized. However, the invention preferably provides for the source primary cusp point to be shear mapped to the destination primary cusp point, after application of a lightness rescaling process as will be described in more detail below.

The primary cusps of particular hues that are determined with this technique can be utilized, for example, in GMAs to greatly improve saturation mapping at the primaries, as well as retention of the smooth transitions between primaries. For example, this "primary cusp" point technique is described below in relation to an embodiment of a GMA shown in FIGS. 8 through 12B. The "primary cusp" point technique can be utilized in other gamut-mapping methods as well, particular when enhanced saturation of destination device colors is desired.

Another technique that can be applied, for instance, to enhance the foregoing example GMA is a technique of lightness compression toward cusp point lightness (J). One advantage of this technique involves improved mapping of smooth color transitions (gradients).

For example, when using the example GMA to map smooth color transitions, certain areas can become de-saturated in a non-smooth fashion, as if the chroma is falling off too quickly as the color heads toward the neutral axis. This non-smooth de-saturation of the example GMA can be a problem since, although the saturation needs to be maximized, this maximization should not be to the detriment of the neutral colors.

Figure 5:
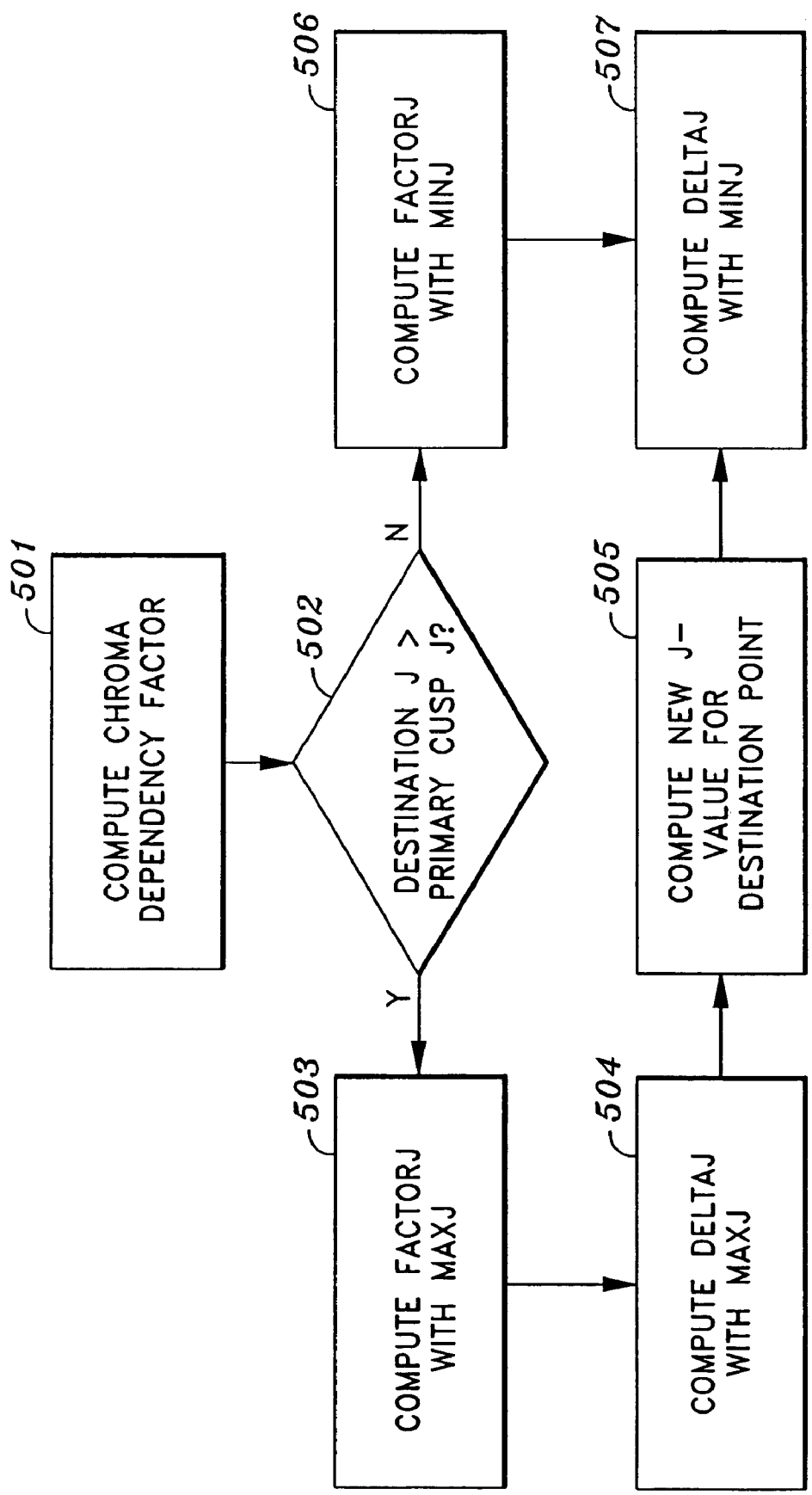
FIG. 5 is a process flowchart according to one embodiment of a technique of lightness compression towards cusp point J.

Accordingly, a lightness compression toward cusp point J was developed. Referring to FIG. 5 and the following mathematical description, one embodiment of the technique of lightness compression toward cusp point J will be described. In this embodiment, the technique involves adjusting the J-value of the destination point, which is called the destination point because it has been shear mapped into the destination gamut.

First, a "factorC" (chroma dependency factor) is computed (501) for the destination point, which determines how much effect the lightness compression will have. For example, one result of using a chroma dependency factor is that points near or on the J-axis will have little or no compression, while points farther away from the J-axis (high-chroma) will have more compression applied. A multiplication factor of 0.5 is applied to ensure that factorC is less than 1 (since is it possible that sourceC could be slightly greater than cuspC, but not twice as great). The following formula is used to compute factorC:

$$\text{factor}C = (\text{destination}C/\text{cusp}C) \times 0.5 \quad (1)$$

where: destinationC is the C-value of the destination point
cuspC is the C-value of the cusp point Next, a determination is made (502) of whether the destination point J-value is above or below the cusp J-value. If the destination point J-value is above the cusp J-value, a "factorJ" with maxJ is computed (503) for the destination point relative to the cusp J-value. This factor will be between 0 and 1 (0 if on the cusp J-value, 1 if at max J-value). The following formula is used to compute factorJ with maxJ:

$$\text{factor}J = (\text{destinations} - \text{cusp}J)/(\text{max}J - \text{cusp}J) \quad (2)$$

where: destinationsJ is the J-value of the destination point
cuspJ is the J-value of the cusp point maxJ is the maximum J-value of the gamut Next, a "deltaJ" with maxJ is calculated (504). Specifically, a gamma-like power function is applied to factorJ, which will reduce factorJ by a certain amount. In this embodiment, the power of 2 (the square, i.e., a second order function) is used. The reduced factorJ is then subtracted from the original factorJ and the result is multiplied by the total J-value range above the cusp J-value to find the deltaJ, which represents the change in J-value after the lightness compression but not including the chroma dependency. The following formula is used for the deltaJ with maxJ:

$$\text{delta}J = (\text{factor}J - (\text{factor}J \times \text{factor}J)) \times (\text{max}J - \text{cusp}J) \quad (3)$$

The chroma dependency factor (factorC) is then applied to the deltaJ (the higher the chroma, the higher the effect), and the new J-value (destinationJnew) for the destination point is computed (505) from the original J-value (destinationJold) using the following equation:

$$\text{destination}J\text{new} = \text{destination}J\text{old} - (\text{delta}J \times \text{factor}C) \quad (4)$$

On the other hand, if the original destination point J-value is determined in step 505 to be below the cusp J-value (cuspJ), then a computation similar to above is performed, but using minJ instead of maxJ to find the range in J-value to compute the factorJ, and taking into account the polarity of the operations "underneath" the cuspJ. Specifically, factorJ with minJ is computed (506) using the following formula:

$$\text{factor}J = (\text{cusp}J - \text{destinations})/(\text{cusp}J - \text{min}J) \quad (5)$$

where: minJ is the minimum J-value of the gamut.

Next, deltaJ with minJ is calculated (507) using the following formula:

$$deltaJ = (factorJ - (factorJ \times factorJ)) \times (cuspJ - minJ) \quad (6)$$

The new J-value for the destination point is then computed (505) using Equation 4, above.

In one advantage, the chroma-dependent lightness compression toward cusp point J can significantly boost the saturation in high-chroma areas while smoothly tapering off toward the neutral axis. In the embodiment shown in FIG. 5, the compression toward the cusp is performed in a gamma-like fashion, where white, black and grays are not affected, nor are points on the cusp J. All other points tend toward the cusp J in a smooth fashion, slightly bunching up near the cusp J. The chroma dependency allows neutral colors to remain unaffected, and the effect of the technique increases on points with higher chroma. Therefore, the technique is a good remedy for de-saturated areas and can even help problems with tone-reversals when using odd-shaped gamuts.

For example, the technique of lightness compression toward cusp point J is described in more detail below in relation to an embodiment of a GMA shown in FIGS. 8 through 12B, which is directed to a GMA with saturation intent using the primary cusp point technique. However, the lightness compression toward cusp point J technique can be utilized in other gamut-mapping methods as well.

Another technique that can be applied, for instance, to enhance the foregoing example GMA is a technique of chroma expansion. In one advantage, this technique allows for a smooth maximization of the chroma range of a destination gamut.

In general, the chroma extent (maximum C-value) of the source gamut at the hue and lightness of the source point is determined. Then, the shear mapping and lightness compression are applied to the source point, yielding the destination point. Finally, the chroma extent of the destination gamut at the lightness and hue of the destination point is determined. The source and destination chroma extents that have been determined for the mapped point are compared. If the destination chroma extent is larger than the source chroma extent, the chroma value (C) of the destination point is increased by a proportional amount. Otherwise, the C-value of the destination point is not changed (however, as an option, the C-value of the destination point can be reduced, depending on the desired result). This technique ensures that the destination chroma range is fully exploited, improving the saturation control considerably.

Figure 6:
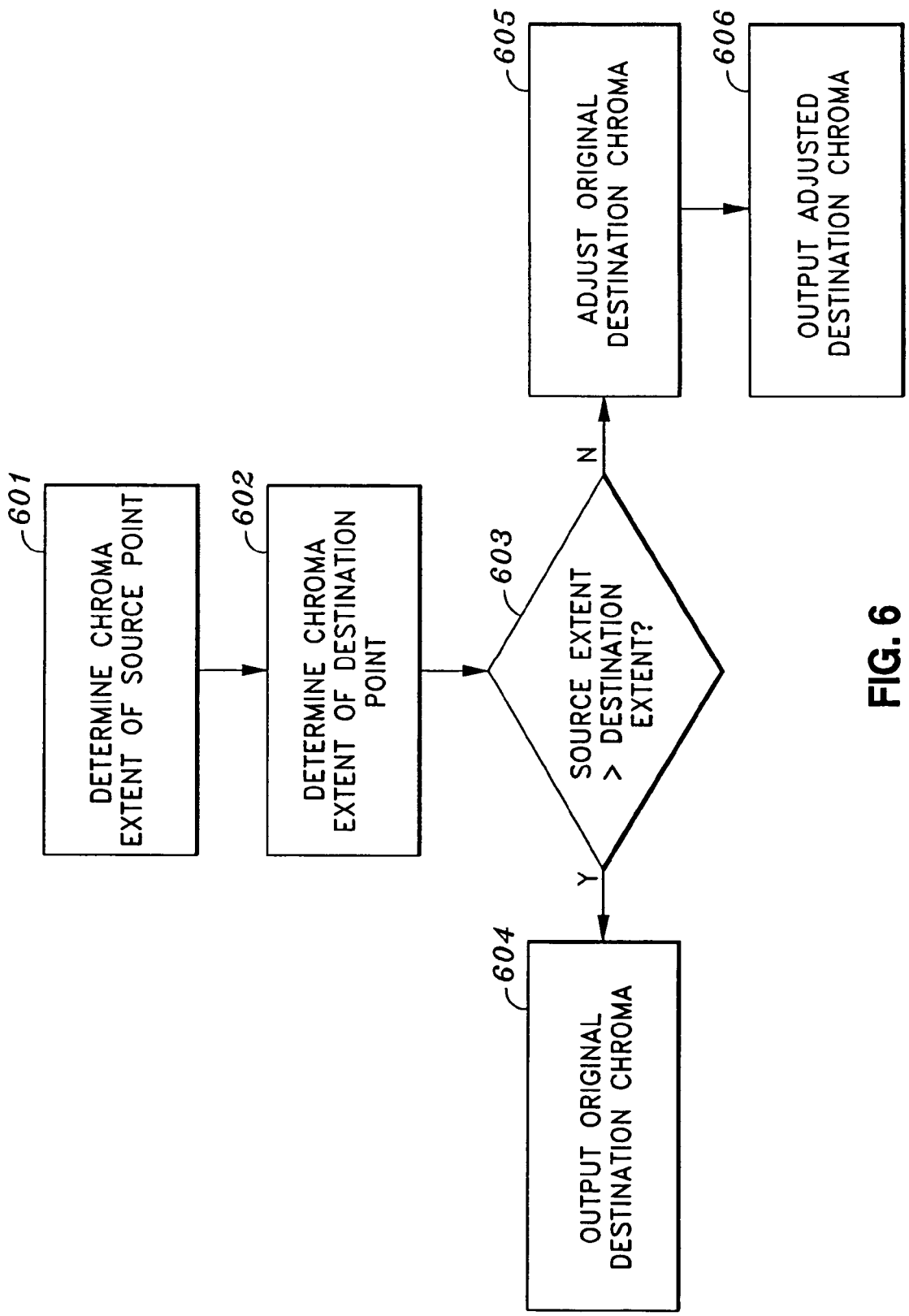
FIG. 6 is a process flowchart according to one embodiment of a chroma expansion technique.

Referring to FIG. 6 and the following mathematical description, one embodiment of the technique of chroma expansion will be described. In this case, the technique involves adjusting the C-value of the destination point, which has been shear mapped (and lightness compressed) into the destination gamut.

First, before the shear mapping, the chroma extent (sourceExtentC) at the lightness and hue of the source point is determined (601). After the shear mapping (and lightness compression), which transforms the source point into the destination point, the chroma extent (destExtentC) at the lightness and hue of the destination point is determined (602). A determination is made (603) of whether the source chroma extent is greater than the destination chroma extent. If the source chroma extent (sourceExtentC) is greater than the destination chroma extent (destExtentC), no chroma adjustment to the destination point is necessary (although depending on the desired result, the following steps for chroma adjustment can still be utilized to shrink the chroma) and the original destination chroma (destinationCold) is output (604).

If the source chroma extent (sourceExtentC) is determined in step 603 not to be greater than the destination chroma extent (destExtentC), the original chroma of the destination point (destinationCold) is adjusted (605) to fit within the destination chroma extent at this lightness and hue using the following equation:

$$destinationCnew = destinationCold \times (destExtentC / sourceExtentC) \quad (8)$$

where: destinationCnew is the adjusted destination point C-value sourceExtentC is the maximum C-value of the source gamut at the lightness and hue of the source point destExtentC is the maximum C-value of the destination gamut at the lightness and hue of the destination point The adjusted destination point C-value is then output (606).

The technique of chroma expansion can be used to maximize the use of chroma range in GMAs. For example, when using the foregoing example GMA some high-chroma areas of the destination gamut might not be filled with source points after the shear mapping process at certain hues. This would result in a lack of saturation in these cases. The technique of chroma expansion was developed to ensure that the chroma range of the destination gamut would be maximized in a smooth fashion, thereby facilitating better and smoother control of the full saturation range.

For example, the technique of chroma expansion is described in more detail below in relation to an embodiment of a GMA shown in FIGS. 8 through 12B, which is directed to a GMA with saturation intent using the primary cusp point technique and the lightness compression toward primary cusp point J technique. However, the chroma expansion technique can be utilized in other gamut-mapping methods as well.

Each of the techniques of the invention, primary cusp point mapping, lightness compression toward cusp point lightness, and chroma expansion, have now been discussed in reference to the embodiments above. Now, one representative embodiment of a GMA utilizing the techniques will be discussed. By applying the techniques in the GMA embodiment, a simulation of saturation control in an appearance space that lacks direct saturation control is possible. In particular, the simulated saturation control is accomplished through the manipulation of lightness and chroma.

Figure 7:
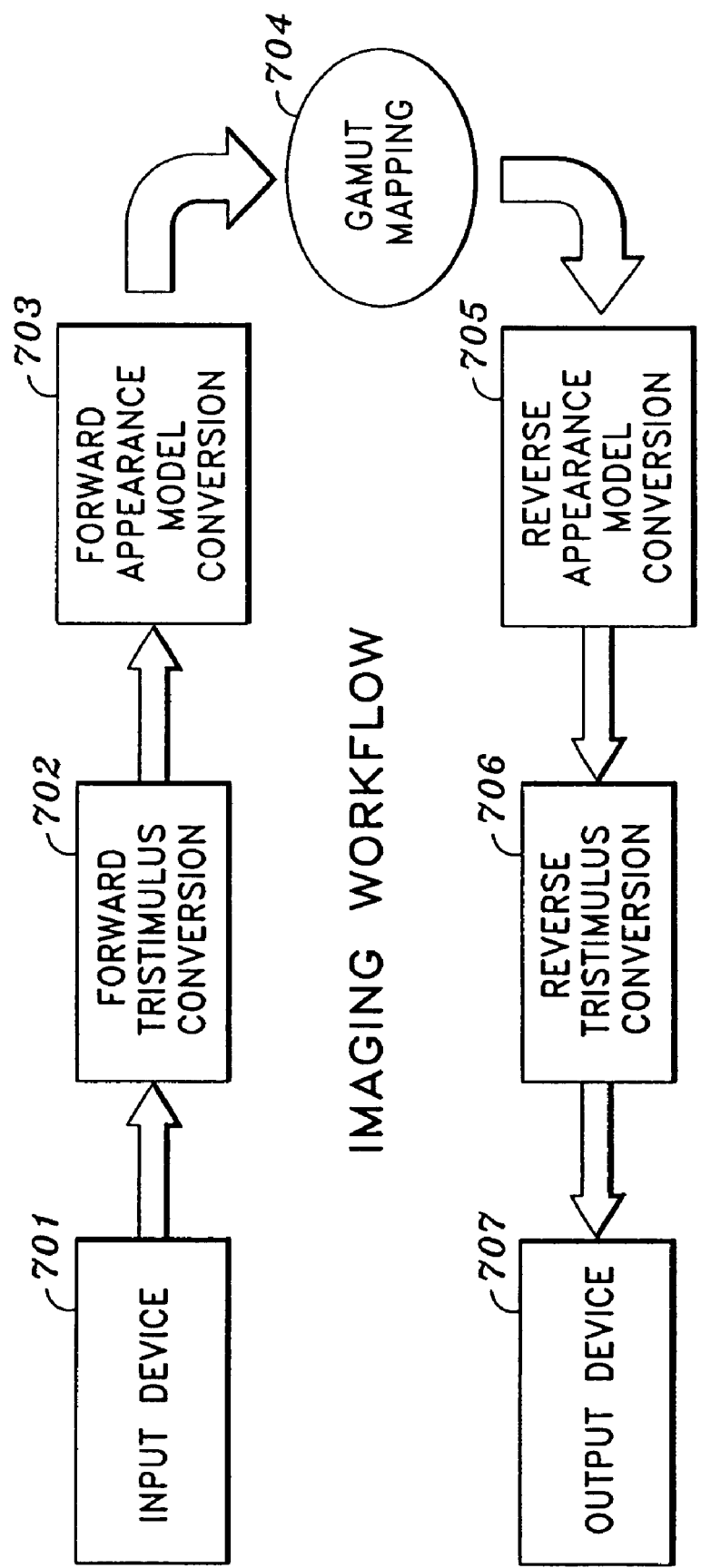
FIG. 7 depicts a high level example of an imaging workflow process in which the present invention can be implemented.

Referring now to FIG. 7, a basic workflow diagram for processing an image in a color management system is depicted. In general terms, an input device 701 (source device) and output device 707 (destination device) are characterized to represent their corresponding gamuts and are profiled by a profiler that generates measurement only profiles (MOPS). Two gamut boundary descriptors are generated using the generated profiles, one each for the source device gamut and the destination device gamut. The image is transformed from the input device-dependent space into a device-independent color appearance space (702 and 703), such as CIECAM02. Gamut mapping 704 is then performed on the image in the color appearance space (e.g., in CIECAM02), where the mapping in performed between the source and destination gamut boundary descriptors. The transformed image is then converted from the device-independent color appearance space into the output device-dependent space (705 and 706). The foregoing process will now be described in more detail.

Figure 8:
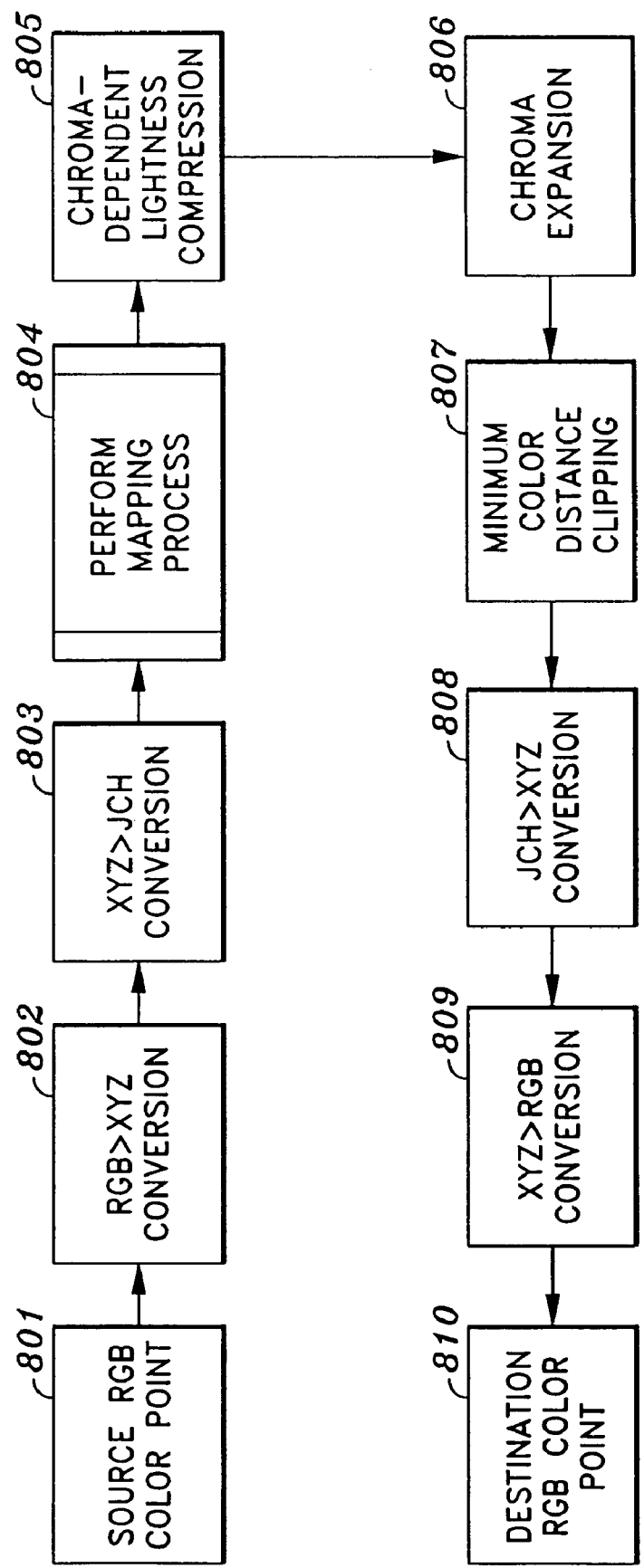
FIG. 8 is a process flowchart according to one embodiment of a GMA according to the present invention.

FIG. 8 is a process flowchart illustrating one embodiment of a GMA with simulated saturation control used in gamut mapping 704. Referring to FIG. 8, as well as FIGS. 9A through 12B, the GMA embodiment will now be described. A source color point is obtained 801 and the RGB values of an input color are converted 802 to tristimulus values (XYZ values). The tristimulus values (XYZ values) are then converted (803) into device-independent color appearance space values, which may be, for example, JCh values in the CIECAM02 color space. The input source point is then mapped (804) to the destination gamut utilizing, for example, the process of FIGS. 4A and 4B above. That is, knowing the hue angle of the input color in the source gamut, a hue rotation process is performed to determine the destination hue angle, while a source primary cusp point and a destination primary cusp point are obtained and mapped so as to map the source point to the destination gamut. As stated above, the mapping process preferably comprises a shear mapping process after performing lightness resealing.

Figure 10:
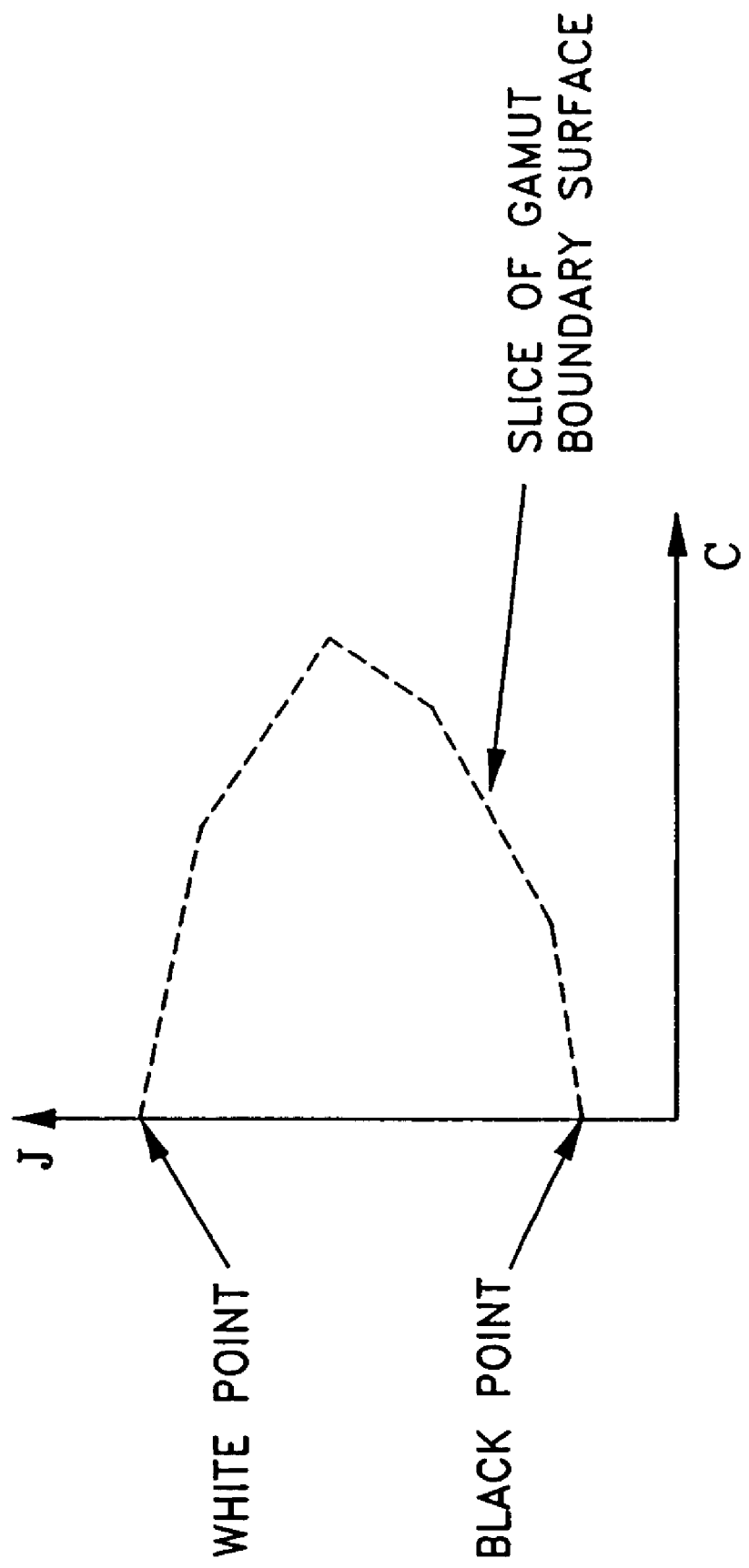
FIG. 10 depicts an example hue leaf showing a slice of a gamut boundary surface at a specific hue.
Figure 11A:
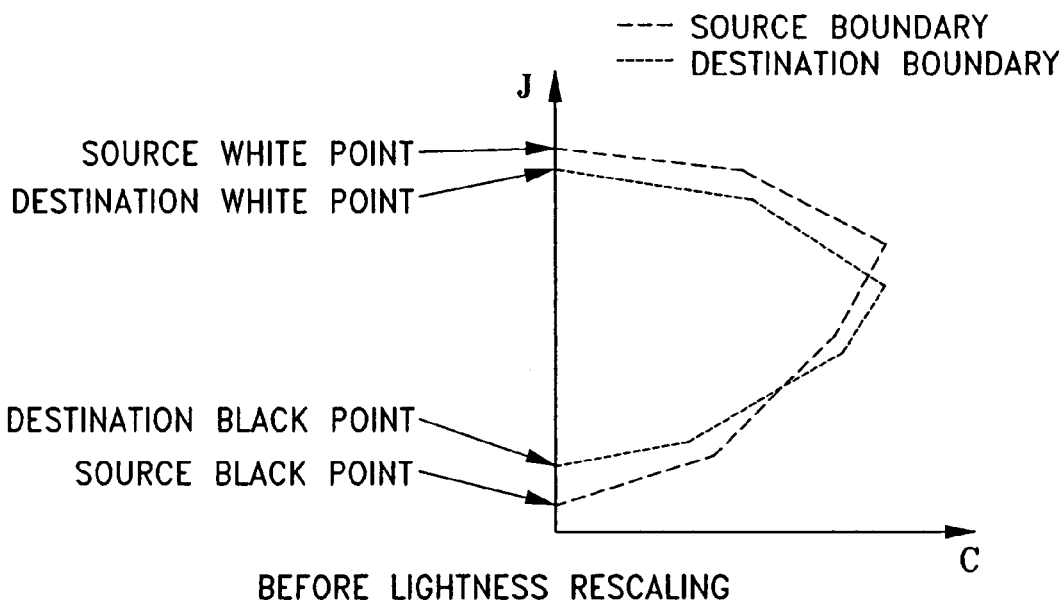
FIGS. 11A and 11B depict lightness a lightness resealing process.
Figure 11B:
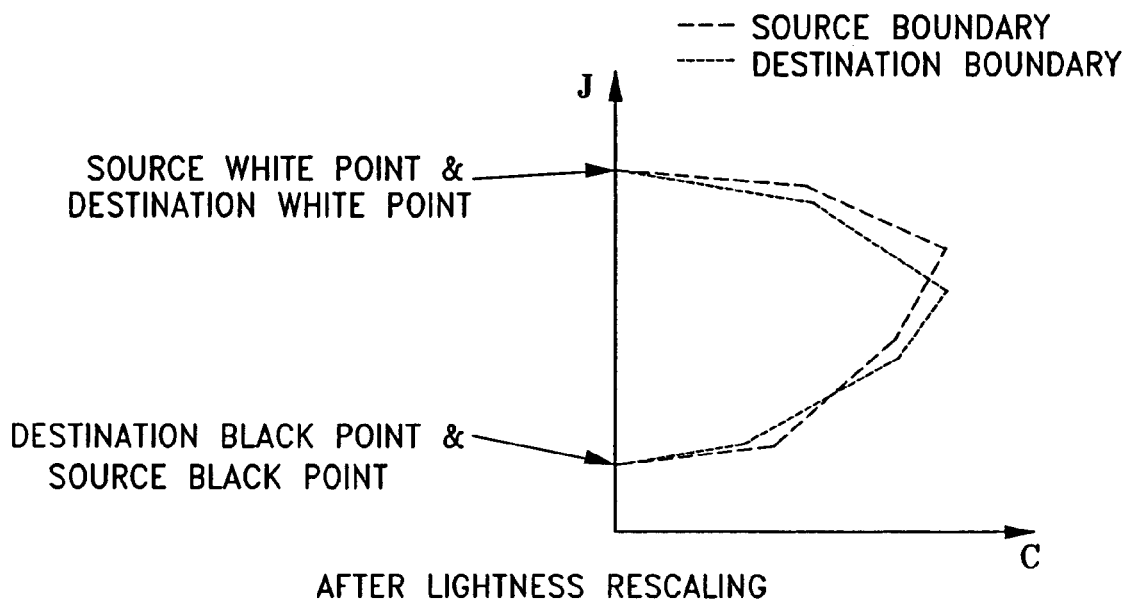

In performing the lightness resealing, the white and black points of the source gamut along the J (lightness) axis are determined, as are the white and black points for the destination gamut. These values are then used to determine the source size and destination size, respectively, and to determine a scaled lightness value as follows:

$$\text{sourcesize}J = \text{sourcemax}J - \text{sourcemin}J \quad (9)$$

$$\text{destsize}J = \text{destmax}J - \text{destmin}J \quad (10)$$

$$\text{dest}J = ((\text{source}J - \text{sourcemin}J) * (\text{destsize}J / \text{source-size}J)) + \text{destmin}J \quad (11)$$

where: sourcemaxJ is the maximum lightness value of the source gamut sourceminJ is the minimum lightness value of the source gamut destmaxJ is the maximum lightness value of the destination gamut destminJ is the minimum lightness value of the destination gamut sourceJ is the lightness value of a source color point destJ is the scaled lightness value An example of the gamut boundary surface obtained by taking a slice through the gamut at a given hue angle is depicted in FIG. 10, while the foregoing lightness rescaling process is depicted in FIGS. 11A and 11B. Specifically, FIG. 11A illustrates that the white and black points of the source and destination gamuts generally do not coincide. Therefore, the white point of the source gamut is scaled along the lightness (J) axis to coincide with the white point of the destination gamut, and the black point of the source gamut is scaled along the lightness (J) axis to coincide with the black point of the destination gamut. The result of this lightness resealing is depicted in FIG. 11B.

Figures 12A, 12B:
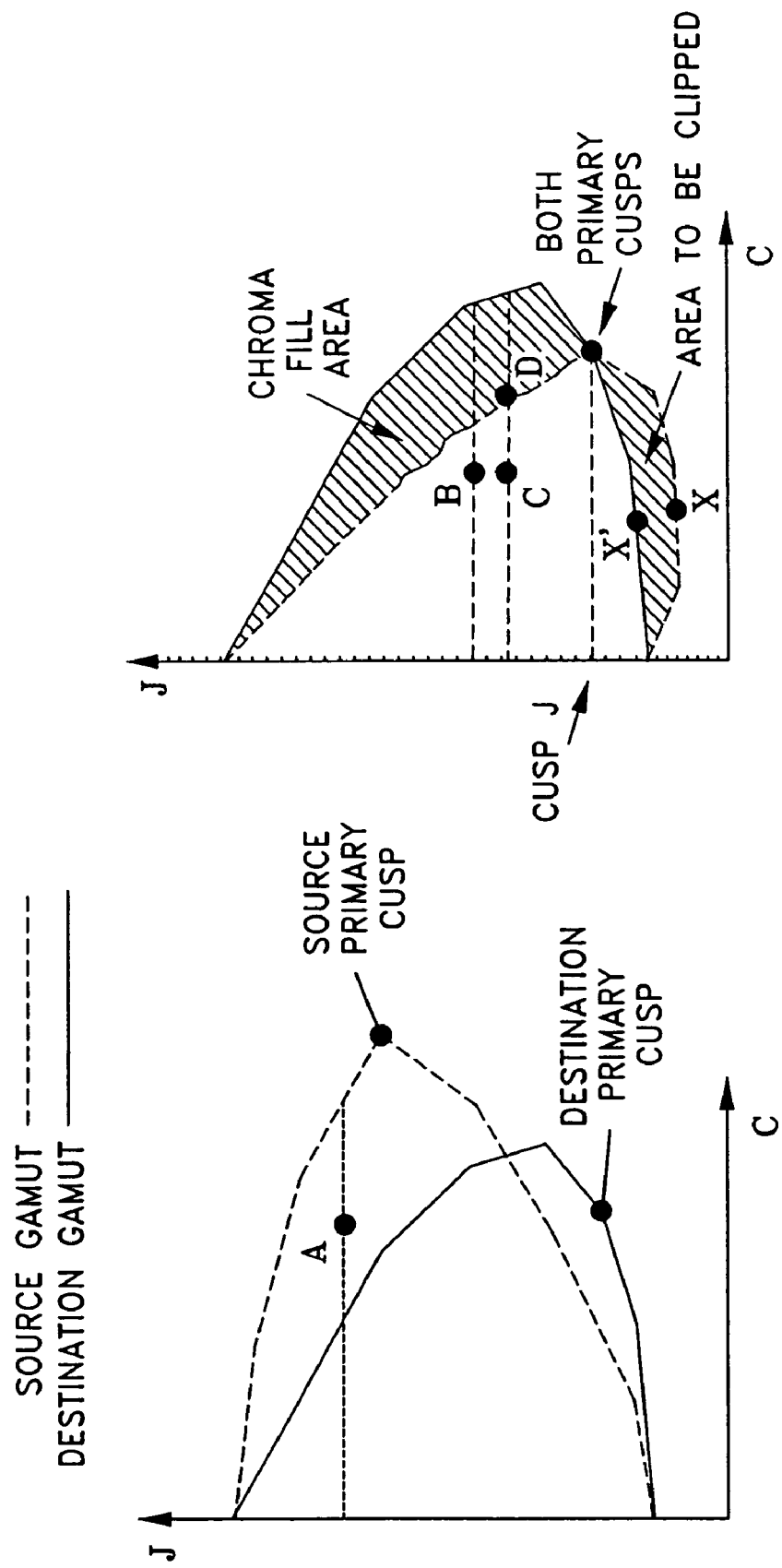
FIGS. 12A and 12B depict a shear mapping to match primary cusps, followed by lightness compression toward primary cusp J, and chroma expansion according to one embodiment of the present invention.

Returning to FIG. 8, the source and destination primary cusp points that are determined in FIGS. 4A and 4B, after the lightness rescaling process, are mapped so as to coincide with one another. In particular, FIG. 12A shows a theoretical source gamut surface and a theoretical destination gamut surface at the source hue angle and the destination hue angle (obtained via hue rotation), and lightness rescaling has been performed. As seen in the figure, the source primary cusp point is determined as in FIG. 4A, while the destination primary cusp point is as determined in FIG. 4B. As shown in FIG. 12A, the source primary cusp point may correspond to the point of maximum chroma at the source hue, but the destination primary cusp point may not correspond to the point of maximum chroma at the destination hue.

After the lightness rescaling, shear mapping is performed so that the primary cusp points of the source and destination coincide. This primary cusp point matching is performed in a shear process as follows. As shown in FIGS. 12A and 12B, the gamut surface can be considered as a series of straight lines that intersect one another. The white point and black point are considered fixed hinges along the lightness (J) axis. In moving the primary cusp point of the source leaf to the primary cusp point location of the destination leaf (FIG. 12B), each straight line portion and intersection point are scaled in proportion to the relocation of the source cusp point. Thus, as seen in FIG. 12B, after lightness rescaling and shear mapping, three points of each hue leaf coincide with one another; the white point, the black point, and the primary cusp point.

FIG. 12A also includes Point A, which is a source point to be mapped to the destination gamut and is depicted prior to shear mapping. In FIG. 12B, a Point B is depicted, which the source point corresponding to Point A after the shear mapping process is performed. In other words, Point B illustrates the shift in position of Point A due to the shear mapping process in which the source primary cusp point is shear mapped to the destination primary cusp point. Thus, Point B is the final result of mapping an input source Point A utilizing the primary cusp point mapping process of FIGS. 4A and 4B. After the foregoing mapping process is performed, additional processes for chroma-dependent lightness compression (FIG. 5) and chroma expansion (FIG. 6) may be performed.

Returning to FIG. 8, chroma-dependent lightness compression of the destination point toward primary cusp point J-value in the destination gamut is performed (805) according to the process of FIG. 5. The result of the process of 805 is illustrated by Point C of FIG. 12B, which is a point corresponding to Point B after chroma-dependent lightness compression is performed. Specifically, Point C illustrates the shift in position of Point B due to the chroma-dependent lightness compression toward primary cusp point J being performed according to FIG. 5.

In FIG. 8, chroma expansion of the destination point in the destination gamut is performed (806) according to the process of FIG. 6. FIG. 12B includes a Point D, which is a point corresponding to Point C after chroma expansion is performed. Specifically, Point D illustrates the shift in position of Point C due to the chroma expansion being performed according to FIG. 6. FIG. 12B also shows a "Chroma Fill Area," which is the area of the destination hue leaf that is outside of the source hue leaf after the shear mapping process was performed. The chroma expansion technique helps to fill the Chroma Fill Area, thus maximizing the use of the destination gamut.

Next in FIG. 8, minimum color distance clipping to the gamut boundary is performed (807) if the destination point is outside the destination gamut after the previous mapping operations. Specifically, any remaining portion of the source gamut that is outside of the destination gamut is mapped using a minimum delta clipping process. As shown in FIG. 12B, a Point X on the source gamut is shifted to the closest point on the destination gamut (Point X') by finding the minimum distance between Point X and a point on the destination gamut, which is Point X'. This clipping process is performed for all points of the source gamut that remain outside of the destination gamut, which is shown in FIG. 12B as "Area to be Clipped."

Finally, in FIG. 8, the results are then converted (808) from the JCh space back to tristimulus values (XYZ values), and the tristimulus values (XYZ values) are converted (809) back to RGB values, so that the destination color point is obtained (810).

As the above-described embodiments illustrate, the techniques of primary cusp point mapping, lightness compression toward cusp point lightness, and chroma expansion can be utilized individually to enhance GMAs. Furthermore, a combination of the techniques of lightness compression toward cusp point lightness and chroma expansion can allow for a simulation of saturation control in an appearance space that lacks a direct saturation element, such as JCh. The advantages are better relative saturation in many cases and smoother results across color transitions (gradients). Since color saturation, not accuracy, is the prime goal, these techniques give good results in a very efficient (fast) manner, especially compared to techniques that use the complex and expensive formulae for dealing with saturation in an appearance space.

Although this invention has been described with the aid of certain specific embodiments, many additional modifications and variations would be apparent to those skilled in the art. It is therefore to be understood that this invention may be practiced otherwise than as specifically described. Thus, the above-described embodiments of the invention should be considered in all respects as illustrative and not restrictive, the scope of the invention to be determined by the claims and their equivalents.

What is claimed is:

1. A method for mapping cusp points for use in a gamut mapping process, the method comprising:
    inputting a source point having a source hue value in a first color gamut;
    obtaining a source hue wheel and a destination hue wheel, each comprising known hue angles for each of primary and secondary color components of the first color gamut and a second color gamut, respectively;
    determining a relative position of the source point on the source hue wheel between the primary hue nearest to the source point in the source hue wheel and the secondary hue nearest to the source point in the source hue wheel;
    determining a first lightness value for the primary hue nearest to the source point in the source hue wheel and a second lightness value for the secondary hue nearest to the source point in the source hue wheel;
    interpolating, utilizing the relative position of the source point as a factor, between the first lightness value and the second lightness value to obtain a first interpolated source lightness value at the hue value of the source point;
    determining a first maximum chroma value from the boundary of the first color gamut at the first interpolated source lightness value and the hue value of the source point, wherein the first interpolated source lightness value, the hue value of the source point, and the first maximum chroma value define a source primary cusp point;
    determining, in the destination hue wheel, a corresponding relative position between a destination primary hue on the destination hue wheel and a destination secondary hue on the destination hue wheel, corresponding, respectively, to the relative position of the source point on the source hue wheel between the primary hue nearest to the source point in the source hue wheel and the secondary hue nearest to the source point in the source hue wheel, the corresponding relative hue position on the destination hue wheel having a destination hue value in the destination hue wheel;
    determining a first destination lightness value for the destination primary hue and a second destination lightness value for the destination secondary hue;
    interpolating, utilizing the corresponding relative position as a factor, between the first destination lightness value and the second destination lightness value to obtain a first interpolated destination lightness value at the destination hue value;
    determining a first maximum destination chroma value from the boundary of the second gamut at the first interpolated destination lightness value and the destination hue value, wherein the first interpolated destination lightness value, the destination hue value, and the first maximum destination chroma value define a destination primary cusp point;
    mapping the source primary cusp point to the destination primary cusp point using a shear mapping technique, and
    storing the mapping of the source primary cusp point to the destination primary cusp point in a memory.

2. The method of claim 1, further comprising:
    determining a chroma dependency factor based on a chroma value of a destination point and a chroma value of the destination primary cusp point;
    determining, if a lightness value of the destination point is greater than a lightness value of the destination primary cusp point, a first factor based on a maximum lightness value of the second color gamut, and determining a new lightness value of the destination point based on the chroma dependency factor and the first factor; and
    determining, if the lightness value of the destination point is not greater then the lightness value of the destination primary cusp point, a second factor based on a minimum lightness value of the second color gamut, and determining the new lightness value of the destination point based on the chroma dependency factor and the second factor.

3. The method of claim 1, further comprising:
    determining a chroma extent at a lightness value and the hue value of the source point in the first color gamut;
    determining a chroma extent at a lightness value and the hue value of a destination point in the second color gamut, the destination point having a chroma value;
    comparing the chroma extent at the lightness value and the hue value of the source point to the chroma extent at the lightness value and the hue value of the destination point; and
    adjusting, if the chroma extent of the destination point is greater than the chroma extent of the source point, the destination point chroma value.

4. A color management module stored on a computer-readable medium that maps cusp points for use in a gamut mapping process,
    wherein the mapping of cusp points includes the steps of:
    inputting a source point having a source hue value in a first color gamut;
    obtaining a source hue wheel and a destination hue wheel, each comprising known hue angles for each of primary and secondary color components of the first color gamut and a second color gamut, respectively;
    determining a relative position of the source point on the source hue wheel between the primary hue nearest to the source point in the source hue wheel and the secondary hue nearest to the source point in the source hue wheel;
    determining a first lightness value for the primary hue nearest to the source point in the source hue wheel and a second lightness value for the secondary hue nearest to the source point in the source hue wheel;

interpolating, utilizing the relative position of the source point as a factor, between the first lightness value and the second lightness value to obtain a first interpolated source lightness value at the hue value of the source point;

determining a first maximum chroma value from the boundary of the first color gamut at the first interpolated source lightness value and the hue value of the source point, wherein the first interpolated source lightness value, the hue value of the source point, and the first maximum chroma value define a source primary cusp point;

determining, in the destination hue wheel, a corresponding relative position between a destination primary hue on the destination hue wheel and a destination secondary hue on the destination hue wheel, corresponding, respectively, to the relative position of the source point on the source hue wheel between the primary hue nearest to the source point in the source hue wheel and the secondary hue nearest to the source point in the source hue wheel, the corresponding relative hue position on the destination hue wheel having a destination hue value in the destination hue wheel;

determining a first destination lightness value for the destination primary hue and a second destination lightness value for the destination secondary hue;

interpolating, utilizing the corresponding relative position as a factor, between the first destination lightness value and the second destination lightness value to obtain a first interpolated destination lightness value at the destination hue value;

determining a first maximum destination chroma value from the boundary of the second gamut at the first interpolated destination lightness value and the destination hue value, wherein the first interpolated destination lightness value, the destination hue value, and the first maximum destination chroma value define a destination primary cusp point;

mapping the source primary cusp point to the destination primary cusp point using a shear mapping technique, and storing the mapping of the source primary cusp point to the destination primary cusp point in a memory.

5. A computer-readable medium storing a computer-executable program, the computer-executable program for mapping cusp points for use in a gamut mapping process, and the computer-executable program executable to perform the steps of:

inputting a source point having a source hue value in a first color gamut;

obtaining a source hue wheel and a destination hue wheel, each comprising known hue angles for each of primary and secondary color components of the first color gamut and a second color gamut, respectively;

determining a relative position of the source point on the source hue wheel between the primary hue nearest to the source point in the source hue wheel and the secondary hue nearest to the source point in the source hue wheel;

determining a first lightness value for the primary hue nearest to the source point in the source hue wheel and a second lightness value for the secondary hue nearest to the source point in the source hue wheel;

interpolating, utilizing the relative position of the source point as a factor, between the first lightness value and the second lightness value to obtain a first interpolated source lightness value at the hue value of the source point;

determining a first maximum chroma value from the boundary of the first color gamut at the first interpolated source lightness value and the hue value of the source point, wherein the first interpolated source lightness value, the hue value of the source point, and the first maximum chroma value define a source primary cusp point;

determining, in the destination hue wheel, a corresponding relative position between a destination primary hue on the destination hue wheel and a destination secondary hue on the destination hue wheel, corresponding, respectively, to the relative position of the source point on the source hue wheel between the primary hue nearest to the source point in the source hue wheel and the secondary hue nearest to the source point in the source hue wheel, the corresponding relative hue position on the destination hue wheel having a destination hue value in the destination hue wheel;

determining a first destination lightness value for the destination primary hue and a second destination lightness value for the destination secondary hue;

interpolating, utilizing the corresponding relative position as a factor, between the first destination lightness value and the second destination lightness value to obtain a first interpolated destination lightness value at the destination hue value;

determining a first maximum destination chroma value from the boundary of the second gamut at the first interpolated destination lightness value and the destination hue value, wherein the first interpolated destination lightness value, the destination hue value, and the first maximum destination chroma value define a destination primary cusp point;

mapping the source primary cusp point to the destination primary cusp point using a shear mapping technique, and storing the mapping of the source primary cusp point to the destination primary cusp point in a memory.

6. An apparatus for mapping cusp points for use in a gamut mapping process, the apparatus comprising:

a memory for storing a program; and a processor for executing the program to perform the steps of:

inputting a source point having a source hue value in a first color gamut;

obtaining a source hue wheel and a destination hue wheel, each comprising known hue angles for each of primary and secondary color components of the first color gamut and a second color gamut, respectively;

determining a relative position of the source point on the source hue wheel between the primary hue nearest to the source point in the source hue wheel and the secondary hue nearest to the source point in the source hue wheel;

determining a first lightness value for the primary hue nearest to the source point in the source hue wheel and a second lightness value for the secondary hue nearest to the source point in the source hue wheel;

interpolating, utilizing the relative position of the source point as a factor, between the first lightness value and the second lightness value to obtain a first interpolated source lightness value at the hue value of the source point;

determining a first maximum chroma value from the boundary of the first color gamut at the first interpolated source lightness value and the hue value of the source point, wherein the first interpolated source lightness value, the hue value of the source point, and the first maximum chroma value define a source primary cusp point;

determining, in the destination hue wheel, a corresponding relative position between a destination primary hue on the destination hue wheel and a destination secondary hue on the destination hue wheel, corresponding, respectively, to the relative position of the source point on the source hue wheel between the primary hue nearest to the source point in the source hue wheel and the secondary hue nearest to the source point in the source hue wheel, the corresponding relative hue position on the destination hue wheel having a destination hue value in the destination hue wheel;

determining a first destination lightness value for the destination primary hue and a second destination lightness value for the destination secondary hue;

interpolating, utilizing the corresponding relative position as a factor, between the first destination lightness value and the second destination lightness value to obtain a first interpolated destination lightness value at the destination hue value;

determining a first maximum destination chroma value from the boundary of the second gamut at the first interpolated destination lightness value and the destination hue value, wherein the first interpolated destination lightness value, the destination hue value, and the first maximum destination chroma value define a destination primary cusp point;

mapping the source primary cusp point to the destination primary cusp point using a shear mapping technique, and storing the mapping of the source primary cusp point to the destination primary cusp point in the memory.

* * * * *